No. 813,250. PATENTED FEB. 20, 1906.
C. M. STEELE.
INTERNAL COMBUSTION ENGINE.
APPLICATION FILED APR. 7, 1905.
2 SHEETS—SHEET 1.
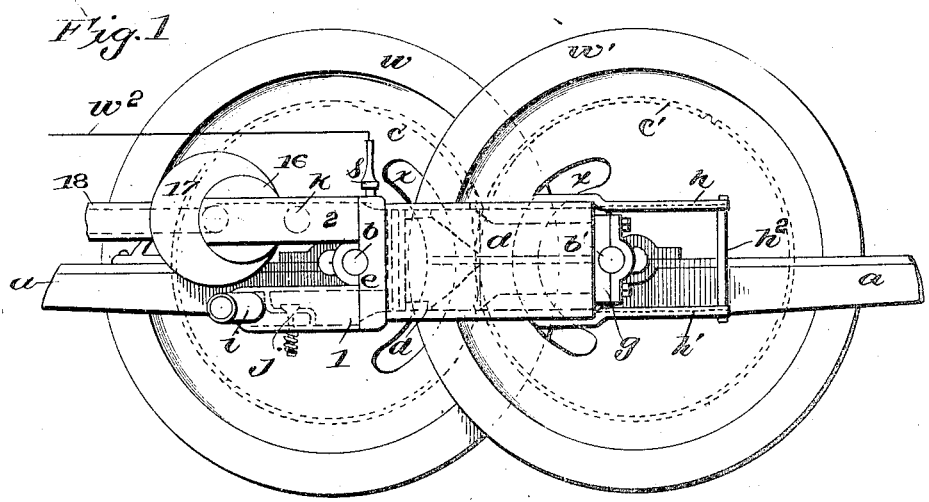
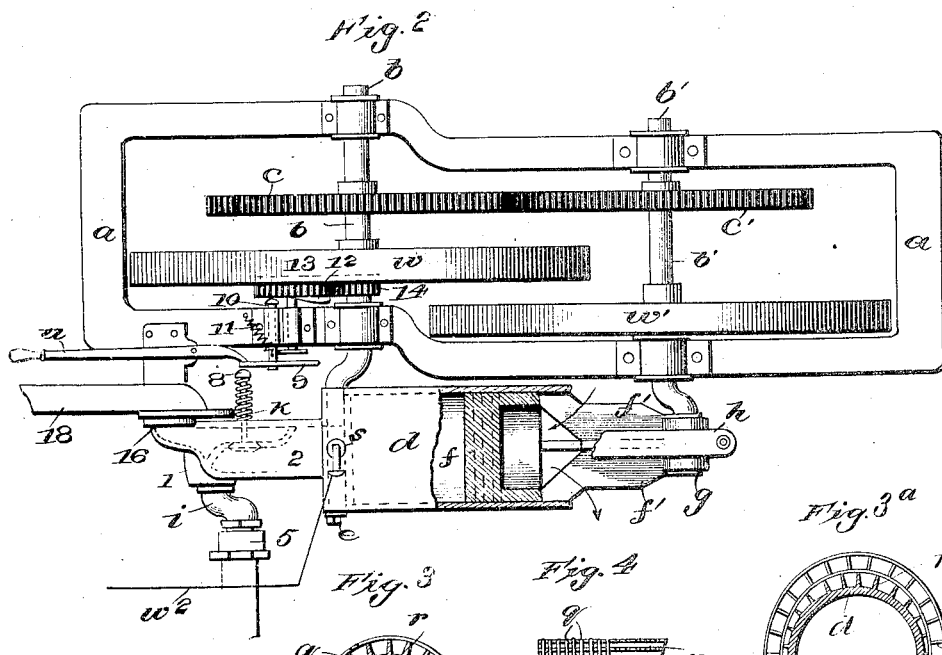
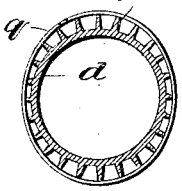
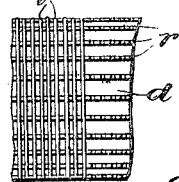
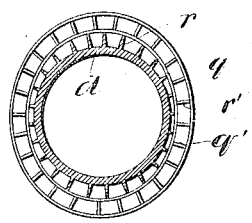
WITNESSES:
C. E. Duffey
Edw. W. Byrn
INVENTOR
CLARENCE M. STEELE
BY Munn & Co.
ATTORNEYS No. 813,250. PATENTED FEB. 20, 1906.
C. M. STEELE.
INTERNAL COMBUSTION ENGINE.
APPLICATION FILED APR. 7, 1905.

2 SHEETS—SHEET 2.

WITNESSES:
C. E. Duffy
Edw. W. Byrn.

INVENTOR
CLARENCE M. STEELE
BY Munn & Co.
ATTORNEYS

UNITED STATES PATENT OFFICE

CLARENCE M. STEELE, OF STATESVILLE, NORTH CAROLINA.

INTERNAL-COMBUSTION ENGINE.

No. 813,250.   Specification of Letters Patent.   Patented Feb. 20, 1906.

Application filed April 7, 1905. Serial No. 254,312.

*To all whom it may concern:*

Be it known that I, CLARENCE M. STEELE, a citizen of the United States, residing at Statesville, in the county of Iredell and State of North Carolina, have invented a new and useful Improvement in Internal-Combustion Engines, of which the following is a specification.

My invention is in the nature of a new and improved internal-combustion engine. Its object is to eliminate or neutralize the shock resulting from the explosion of the charge and its effect upon the engine and to provide means for more effectually air-cooling the parts.

To these ends it consists in mounting the piston and cylinder, respectively, upon separate parallel crank-shafts, so that the explosion of the charge causes the cylinder to yield in one direction and the piston in the other, the cylinder turning one crank-shaft and the piston the other, both shafts being connected by toothed wheels running in opposite direction.

It also consists in the means for strengthening the light cylinder and increasing the radiating-surface and in other accessories essential to an engine working on the above-described principle, as will be hereinafter fully described with reference to the drawings, in which—

Figure 5:
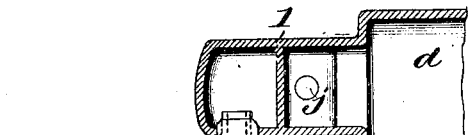
Figure 6:
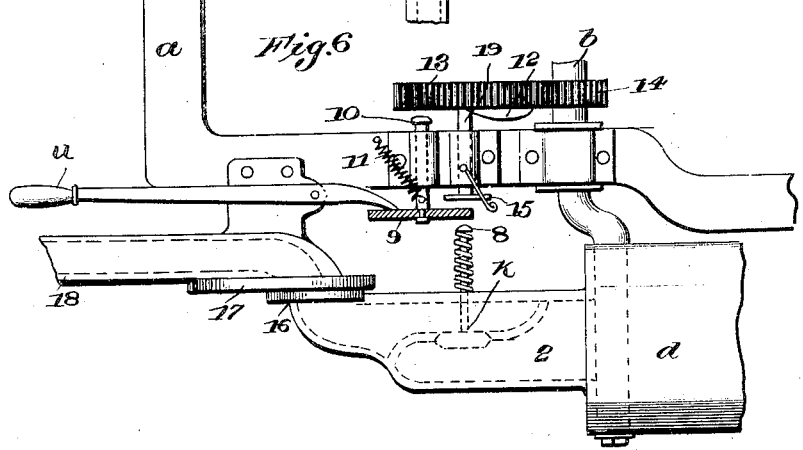
Figure 7:
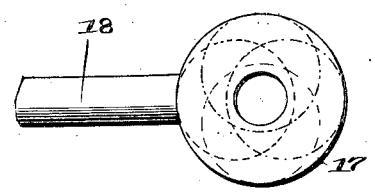
Figure 8:
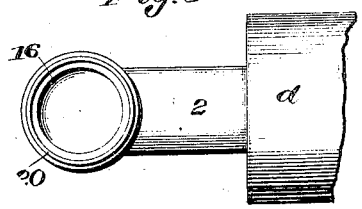
Figure 9:
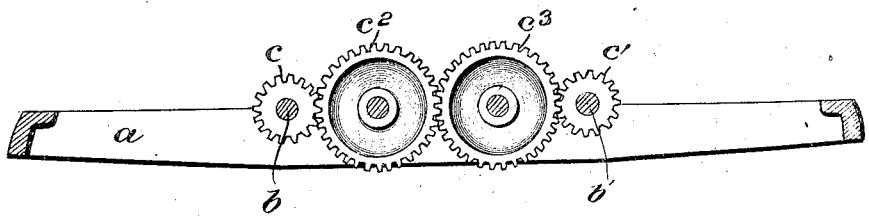

Figure 1 is a side elevation; Fig. 2, a plan view; Fig. 3, a detail showing a cross-section of the cylinder; Fig. 3$^a$, a modification of the same; Fig. 4, a detail showing a portion of the cylinder in side view. Fig. 5 is an enlarged detail of the intake connections for the moving cylinder; Fig. 6, an enlarged detail of the exhaust connection for the same. Figs. 7 and 8 are details showing the adjacent faces of the connections for the exhaust whereby the free outlet discharge is maintained in spite of the movement of the cylinder, and Fig. 9 is a detail of a modification of the gears.

In the drawings, Figs. 1 and 2, $a$ represents the bed-plate of the engine, and $b$ $b'$ are two parallel crank-shafts mounted in bearings thereon. These crank-shafts have crank extensions on one side of the bed-plate, on which are hung, respectively, the cylinder $d$ and the piston $f$. The throw of each crank is just one-half of the stroke of the engine, so that both crank-shafts revolving together move outwardly at the same time and inwardly at the same time, and thus accommodate the full stroke of the engine, the cylinder and piston reciprocating vertically in unison and reciprocating horizontally to and from each other. As shown in Fig. 2, the crank-shafts are geared together by two large gear-wheels $c$ $c'$ of equal size. For varying the speed intermediate gears may be employed, as seen in Fig. 9. In this view the small wheels $c$ $c'$ are the same wheels as the large ones bearing the same letters in Fig. 2, except that they are made smaller to give space between them. In this space larger intermeshing gear-wheels $c^2$ $c^3$ of equal size are arranged to mesh, respectively, with $c$ and $c'$. The power taken off from the shafts of these gears $c^2$ $c^3$, it will be seen, is at a very much reduced speed, depending upon the ratio of the teeth of wheels $c$ $c'$ to the teeth of $c^2$ $c^3$. The cylinder $d$ is provided at its outer end with a bearing $e$, which embraces the crank of shaft $b$, while the piston $f$ is formed with a box $g$, which embraces the crank of the other shaft $b'$. The cylinder $d$ is formed at its open end with two horizontally-extended parallel bars $h$ and $h'$, which inclose between them the box $g$ of the piston and form guides in which the box slides for holding the piston and cylinder parallel. The outer ends of these guides are preferably connected by a cross-piece $h^2$, forming a yoke inclosing the crank-shaft $b'$ and serving to stiffen and strengthen the guides $h$ $h'$. The cranks of the two shafts are set in gear so as to be always on a level with each other, the one carrying the cylinder and its attached parts and the other the piston and giving to the engine a stroke equal to the throw of the two cranks combined. With this arrangement it will be seen that the shock of the explosion will be taken up equally by the two cranks counteracting or neutralizing each other, and thus eliminating the recoil and increasing the power and economy of the engine by the amount of power ordinarily lost in the recoil of engines having either the cylinder or piston stationary. As the cylinder in which the charge is exploded has a rotary parallel movement with its piston, some special provision must be made for maintaining the connections for the intake and exhaust passages.

To connect the fuel-supply, (see Figs. 1, 2, 5,) the outer end of the cylinder is formed with a hollow extension 1, Fig. 1, having a partition in which is seated a spring-held inlet-valve $j'$, which, as shown, is opened from the suction of the piston in the cylinder. The outer end of this hollow extension is connected to a hollow crank $i$, Figs. 2 and 5, which has a stroke equal to that of the cylinder-crank. This hollow crank $i$ (see Fig. 5) swivels tightly in the hollow extension 1 by means of a stuffing-box 3, and its other end, by means of a stuffing-box 4, swivels in a thimble 5, which is connected to the fuel-supply-pipe or the carbureter. It will therefore be seen that the cylinder in its rotary parallel motion is at all times in open communication through its intake-valve $j$ with the fuel-supply. As shown, the intake-valve $j$ is of the usual puppet type, operating automatically; but it may be operated in any other way.

I will now describe how the moving cylinder maintains its communication with the exhaust-pipe. For this purpose the cylinder at its outer end is provided with a second hollow extension 2 just above the intake extension 1. This extension has in it a partition in which plays a horizontally-arranged valve $k$. (See Figs. 2 and 6.) The end of this hollow extension has a circular lateral outlet 16, having an annular groove in its face provided with a packing-ring 20, which tightly rests against a larger disk or flange 17, formed about the end of the stationary exhaust-pipe 18. The lateral outlet 16 is of such size in relation to the disk 17 that although it is always eccentric to said disk yet it always registers with the outlet-opening in the center of such disk, and this is true for all positions of the cylinder in its parallel rotary movement, as seen by the dotted lines in Fig. 7, which represent different positions of the outlet 16 thereupon. This packed outlet-opening 16, it will be seen, constantly scours against the flange or disk 17 and both maintains a tight joint therewith and a constant communication with the outlet-pipe 18. The exhaust-valve $k$ is positively operated as follows: Its stem passes through the side of the hollow extension 2 and is surrounded by a spiral spring which presses against an enlarged head 8 to normally hold the valve closed. To open it at the proper time, a push-plate 9 is at the proper time forced against the head 8 of the valve-stem as follows: The plate 9 is carried on a sliding bar 10, Fig. 6, in a guide on the main frame, and this plate 9 is made large enough to always cover the area of space traversed by the valve-head 8 as it moves with the cylinder, so that the plate 9 when pushed in will strike the valve-head 8 and push the latter in any of its positions. The plate 9 is normally held away from the valve-head by a spring 11 acting on the bar 10 and is forced in by a cam 12, fixed on the side of a toothed wheel 13, which is in gear with and driven by a pinion 14 on the shaft $b$, which pinion has half the number of teeth of gear 13. The push-plate 9 is preferably constructed as a disk, and it rotates freely on its bar 10, so that when the disk touches the valve-head 8 the disk turns with the valve-head, to reduce friction, at the same time that the valve-head is being forced in by the disk. As the gear 13 revolves its cam 12 strikes the end of the bar 10, and to cause the valve to open sooner or later or for a longer or shorter exhaust the position of the cam 12 on the gear is preferably made adjustable. The gear 13 is fixed to a short shaft 19, and on the end of this shaft is the revolving contact-point 15 for closing the circuit of the spark device, which circuit is completed through wire $w^2$ and spark-plug $s$, as seen in Fig. 1, in a well-known way, which need not be further described.

In constructing my engine the weight of the cylinder and piston are counterbalanced on their respective shafts by cutting away on the rims of their respective fly-wheels $w$ $w'$ on the same side with the cranks, as at $x$, Fig. 1, or by weighting these fly-wheels opposite the cranks in the well-known manner.

It is advisable to have the cylinder of this engine as light as possible. To accomplish this and get the strength and at the same time increase the radiating-surface, I cast the cylinder light, with parallel ribs $r$ on the outside arranged lengthwise the cylinder, as seen in Figs. 3 and 4. These ribs are notched on their outer edges, and in these notches there are wound spirally coils of steel wire $q$, arranged close together and a distance apart about equal to the thickness of the wire. Two or more sets of these ribs and layers of wire may be used, as seen in Fig. $3^a$, and their function is to give great radiating-surface to cool the cylinder. As a further means of air-cooling this engine I construct the piston hollow and connect it with its box by thin radial blades or ribs $f'$ $f'$, which do not extend to the back end of the piston. These ribs radiate heat and at the same time throw the air into the piston as the latter swings around in the vertical plane of its movement, the openings between the ribs allowing the air to circulate through and out below on the upstroke and reversing on the downstroke.

To relieve the compression in starting the engine, the press-plate 9 is manually thrown against the outlet-valve $k$, and for this purpose a lever $u$ is fulcrumed to the bed-frame $a$, so as to swing, and the inner end of this lever is made to bear against the side of the press-plate opposite the valve.

In carrying out my invention I do not confine myself to the special arrangement of parts shown and described. I may, for instance, use two or more of the cylinders and pistons and may hang them at any suitable points on the shafts $b$ $b'$ or may otherwise modify the construction without departing from the scope of my invention as set forth in the claims.

Having thus described my invention, what

I claim as new, and desire to secure by Letters Patent, is—

1. An internal-combustion engine, comprising two parallel crank-shafts, a cylinder hung on one crank-shaft and a piston hung on the other crank-shaft, means for holding the same parallel, and means for maintaining the intake and exhaust connections.

2. An internal-combustion engine, comprising a pair of parallel crank-shafts, gears for connecting them to run in opposite directions and at the same speed, the combined throw of the cranks equaling the stroke of the engine, a cylinder mounted upon one crank, and a piston mounted upon the other crank, whereby the shock of the explosion is absorbed equally by the two cranks to eliminate recoil and increase the economy.

3. An internal-combustion engine, comprising two parallel crank-shafts, a cylinder mounted on one crank-shaft, a piston mounted upon the other crank-shaft and a flywheel for each crank-shaft having an excess of weight on one side to balance the weight of the cylinder and the piston.

4. An internal-combustion engine, comprising two parallel crank-shafts, gears for connecting them to run in opposite directions, a cylinder hung on one crank-shaft, a piston hung upon the other crank-shaft, said cranks having together a throw equal to the stroke of the engine and the piston and cylinder having a rectilinear reciprocation to and from each other and a parallel lateral motion at right angles to the line of rectilinear reciprocation.

5. An internal-combustion engine, comprising a crank-shaft, a cylinder hung on the crank of said shaft and a fuel-supply for the cylinder consisting of a hollow crank having the same stroke as the crank on which the cylinder is hung.

6. An internal-combustion engine, comprising a crank-shaft, a cylinder hung on the crank of said shaft, and an exhaust connection for the cylinder consisting of a stationary exhaust-pipe having a terminal face-plate with the exhaust-pipe opening through the center of it, the plane of the face-plate being parallel to the longitudinal axis of the cylinder and a lateral outlet from the cylinder lying parallel to and scouring against said face-plate.

7. An internal-combustion engine, comprising a crank-shaft, a cylinder hung on the crank of said shaft and an exhaust connection for the cylinder consisting of two scouring-faces, both of said faces having openings through them and one of said faces having an extended flange to always cover the opening in the other face throughout all positions of the cylinder.

8. An internal-combustion engine, comprising a crank-shaft, a cylinder hung on the crank of said shaft, an exhaust-valve having a stem extending laterally to the cylinder and partaking of the rotary motion of the said cylinder, mechanism for opening said exhaust-valve consisting of a relatively stationary push-plate made large enough to cover the traverse of the exhaust-valve, a stationary frame supporting said push-plate and means for forcing the push-plate against the valve.

9. An internal-combustion engine, comprising a crank-shaft, a cylinder hung on the crank of said shaft, an exhaust-valve extending laterally to the cylinder and mechanism for opening said exhaust-valve consisting of a push-plate made large enough to cover the traverse of said valve, said push-plate being constructed and arranged to revolve and means for forcing it against the valve.

10. An internal-combustion engine, comprising a crank-shaft, a cylinder hung on the crank of said shaft, an exhaust-valve extending laterally to the cylinder, a push-plate for opening said exhaust-valve made large enough to cover the traverse of said valve, means for automatically operating the push-plate by the engine and means for operating the push-plate manually and at will in starting the engine.

11. An internal-combustion engine, comprising a crank-shaft, a cylinder hung on the crank of said shaft, an exhaust-valve extending laterally to the cylinder, a push-plate covering the traverse of said valve, a slide-bar attached to the push-plate, a gear-wheel having a cam on its side operating the slide-bar and another gear-wheel meshing with the first-named and fixed to the crank-shaft.

CLARENCE M. STEELE.

Witnesses:
HENRY OSCAR STEELE,
J. H. ROCKWELL.